(12) United States Patent
Kuo

(10) Patent No.: US 7,673,085 B2
(45) Date of Patent: Mar. 2, 2010

(54) MULTI-CHANNEL COMMUNICATION CIRCUIT

(75) Inventor: Heng-Chen Kuo, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 95 days.

(21) Appl. No.: 11/965,766

(22) Filed: Dec. 28, 2007

(65) Prior Publication Data

US 2009/0157930 A1 Jun. 18, 2009

(30) Foreign Application Priority Data

Dec. 18, 2007 (CN) .......................... 2007 1 0203158

(51) Int. Cl.
*G06F 13/00* (2006.01)
(52) U.S. Cl. ...................... 710/110; 710/316
(58) Field of Classification Search ................. 710/110, 710/316
See application file for complete search history.

(56) References Cited

U.S. PATENT DOCUMENTS 5,892,933 A * 4/1999 Voltz ........................... 710/316

| | | | |
|---|---|---|---|
| RE37,414 E * | 10/2001 | Harlick | 463/42 |
| 6,378,017 B1 * | 4/2002 | Girzon et al. | 710/306 |
| 6,917,998 B1 * | 7/2005 | Giles | 710/300 |
| 2003/0110302 A1 * | 6/2003 | Hodges et al. | 709/249 |
| 2004/0042449 A1 * | 3/2004 | Kamimura et al. | 370/366 |

* cited by examiner

*Primary Examiner*—Glenn A Auve
(74) *Attorney, Agent, or Firm*—Frank R. Niranjan

(57) ABSTRACT

A multi-channel communication circuit includes a master device, a plurality of slave devices, and a multiplexer (MUX). A transmitting pin and a receiving pin of a serial interface of the master device are respectively connected to a first data input pin and a first data output pin of the MUX. Two control pins of the serial interface of the master device are connected to two selecting pins of the MUX. Four pins of the serial interface of the master device are connected to a power pin of the MUX. Transmitting pins of a serial interface of each slave device are respectively connected to a plurality of second data input pins of the MUX and receiving pins of a serial interface of each slave device are respectively connected to a plurality of second data output pins of the MUX, the master device communicates with one slave device via transmitting a corresponding selecting signal to the two selecting pins of the MUX to select one slave device.

9 Claims, 2 Drawing Sheets

MULTI-CHANNEL COMMUNICATION CIRCUIT

BACKGROUND

1. Field of the Invention

The present invention relates to communication circuits, and particularly to a multi-channel communication circuit between a master device and a plurality of slave devices.

2. Description of Related Art

In communication circuits, serial interfaces such as RS232 serial interfaces are familiar communication interfaces for data communications between a master device such as a server and a plurality of slave devices such as uninterrupted power supplies (UPS).

However, this communication circuit only allows the master device to connect with one of the slave devices at any given time via the serial interfaces thereof. If the master device needs to access another slave device, the user must connect a serial interface of the master device to a serial interface of another slave device again, which is very inconvenient.

What is desired, therefore, is to provide a multi-channel communication circuit which can let a master device connect with a plurality of slave devices at the same time.

SUMMARY

An embodiment of a multi-channel communication circuit includes a master device, a plurality of slave devices, and a multiplexer (MUX). A transmitting pin and a receiving pin of a serial interface of the master device are respectively connected to two data input pins of the MUX. Two control pins of the serial interface of the master device are connected to two selecting pins of the MUX respectively. A ground pin of the serial interface of the master device is connected a ground pin of the MUX. Four pins of the serial interface of the master device are connected to a power pin of the MUX. A transmitting pin and a receiving pin of a serial interface of each slave device are respectively connected to two data output pins of the MUX, the master device communicates with one slave device via transmitting a corresponding selecting signal to the two selecting pins of the MUX to select one of the plurality of slave devices.

Other advantages and novel features of the present invention will become more apparent from the following detailed description of an embodiment when taken in conjunction with the accompanying drawings, in which:

DETAILED DESCRIPTION

Figure 1:
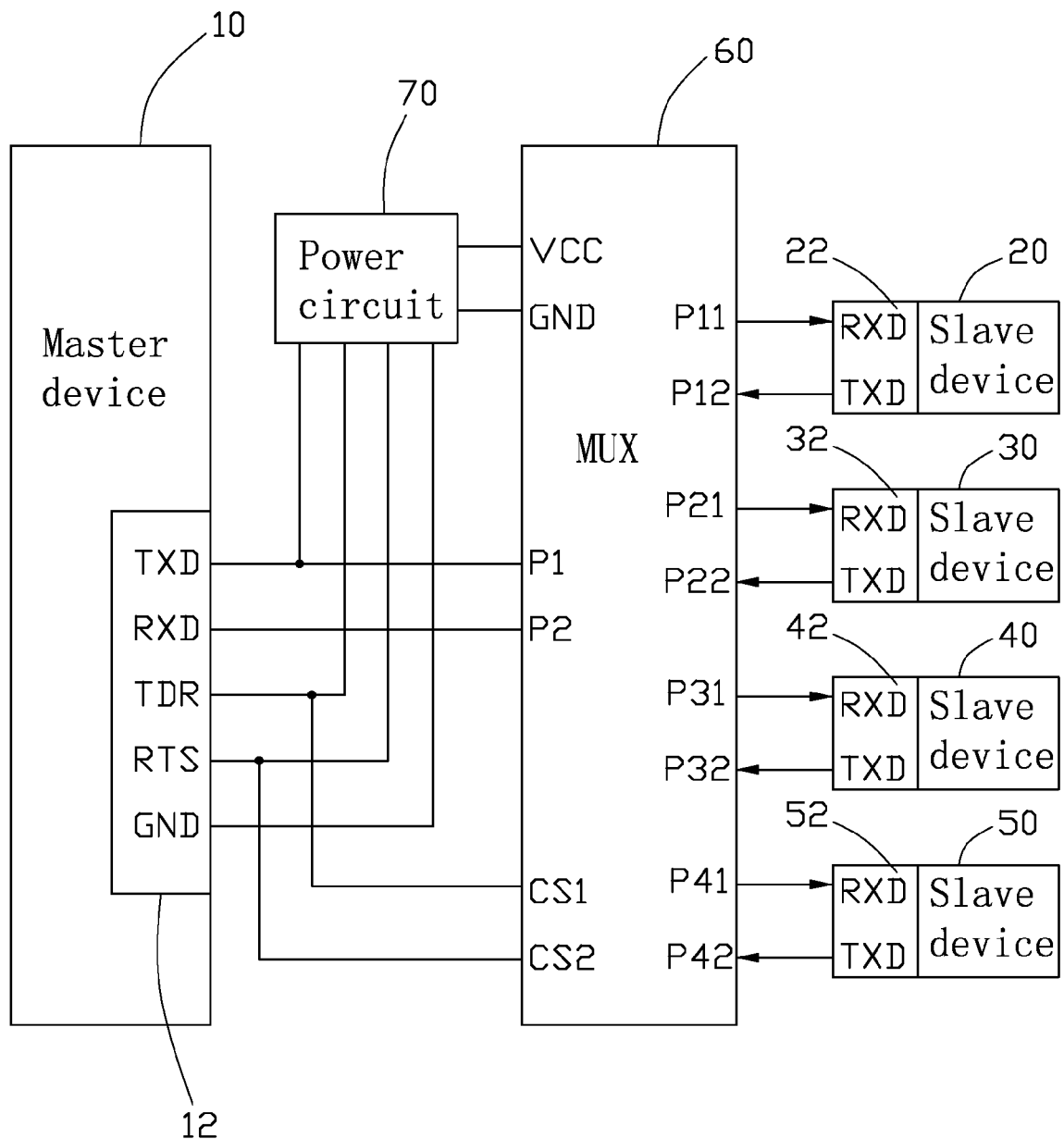
FIG. 1 is a block diagram of a multi-channel communication circuit in accordance with an embodiment of the present invention.

Referring to FIG. 1, a multi-channel communication circuit in accordance with an embodiment of the present invention includes a master device 10 such as a server, four slave devices 20, 30, 40, and 50 such as uninterrupted power supply (UPS) systems, a multiplexer (MUX) 60, and a power circuit 70. The amount of the slave devices can be varied according to need.

The master device 10 includes an RS232 serial interface 12. The slave devices 20, 30, 40, and 50 respectively include four RS232 serial interfaces 22, 32, 42, and 52. The RS232 serial interfaces 12, 22, 32, 42, and 52 each include a transmitting pin TXD, a receiving pin RXD, six control pins (TDR, RTS, DCD, DSR, CTS, RI), and a ground pin GND. In this embodiment, the transmitting pin TXD, the receiving pin RXD, the control pins TDR and RTS, and the ground pin GND of the RS232 serial interface 12 of the master device 10 are used, the transmitting pin TXD and the receiving pin RXD of each of the RS232 serial interfaces 22, 32, 42, and 52 are used.

The transmitting pin TXD and the receiving pin RXD of the RS232 serial interface 12 of the master device 10 are respectively connected to a data input pin P1 and a data output pin P2 of the MUX 60. The control pins TDR and RTS of the RS232 serial interface 12 are respectively connected to two selecting pins CS1 and CS2 of the MUX 60. A data input pin P12 and a data output pin P11 of the MUX 60 are respectively connected to the transmitting pin TXD and the receiving pin RXD of the RS232 serial interface 22 of the slave device 20. A data input pin P22 and a data output pin P21 of the MUX 60 are respectively connected to the transmitting pin TXD and the receiving pin RXD of the RS232 serial interface 32 of the slave device 30. A data input pin P32 and a data output pin P31 of the MUX 60 are respectively connected to the transmitting pin TXD and the receiving pin RXD of the RS232 serial interface 42 of the slave device 40. A data input pin P42 and a data output pin P41 of the MUX 60 are respectively connected to the transmitting pin TXD and the receiving pin RXD of the RS232 serial interface 52 of the slave device 50.

Figure 2:
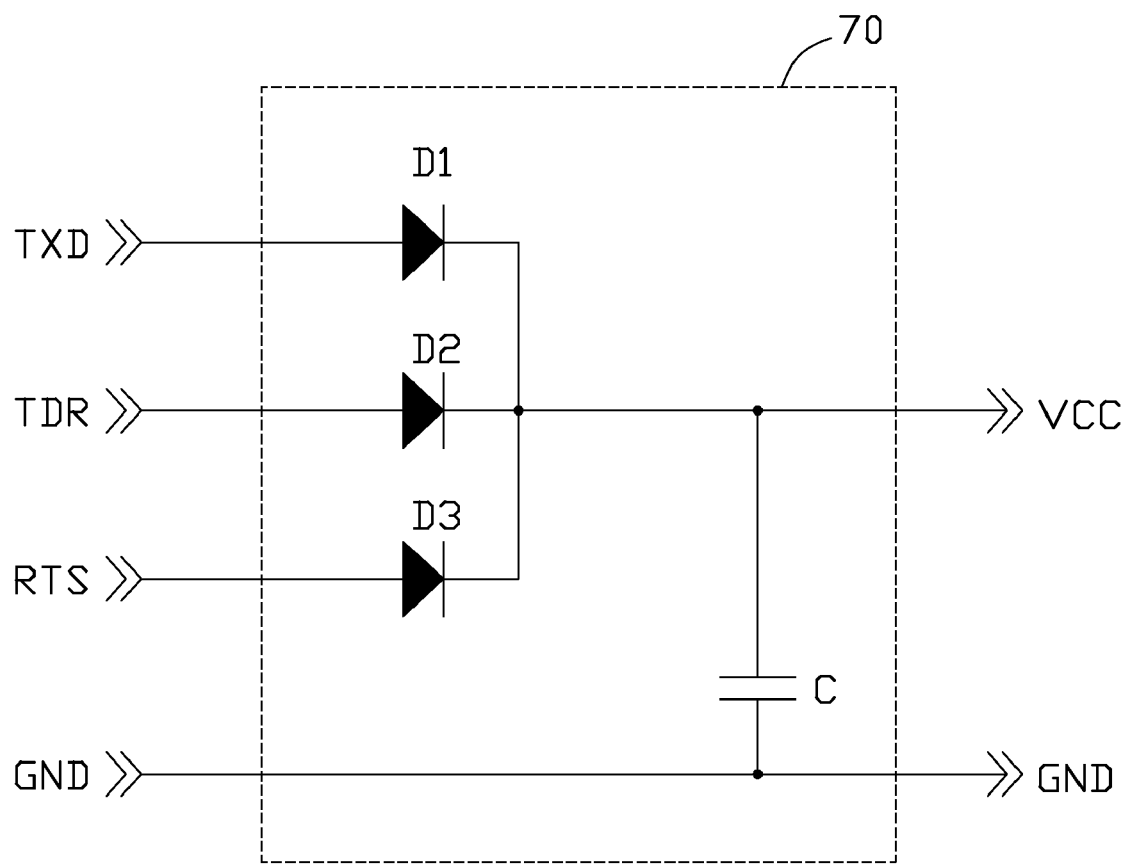
FIG. 2 is a circuit diagram of a power circuit of the multi-channel communication circuit of FIG. 1.

Referring also to FIG. 2, the power circuit 70 includes a storage capacitor C, and three diodes D1, D2, and D3. The anodes of the diodes D1, D2, and D3 are respectively connected to the transmitting pin TXD and the control pins TDR and RTS of the RS232 serial interface 12 of the master device 10. The cathodes of the diodes D1, D2, and D3 are connected to a power pin VCC of the MUX 60. The ground pin GND of the RS232 serial interface 12 of the master device 10 is connected to a ground pin of the MUX 60. The storage capacitor C is connected between the power pin VCC and the ground pin GND of the MUX 60.

In use, if the master device 10 needs to access the slave device 20, the control pins TDR and RTS of the RS232 serial interface 12 transmit a corresponding selecting signal to the MUX 60 to make the data input pin P1 and the data output pin P2 be respectively communicated with the data output pin P11 and the data input pin P12, thereby the master device 10 can communicate with the slave device 20. Similarly, if the master device 10 needs to access one of the other slave devices 30, 40, and 50, the control pins TDR and RTS of the RS232 serial interface 12 transmit a corresponding selecting signal to the MUX 60 to make the data input pin P1 and the data output pin P2 be respectively communicated with the corresponding data output pins P21 or P31 or P41 and the data input pins P22 or P32 or P42, instead, thereby the master device 10 will instead communicate with the selected slave device 30 or 40 or 50, which is very convenient.

In this embodiment, the value from the control pins TDR and RTS of the RS232 serial interface 12 and the slave devices 20, 30, 40, and 50 have a corresponding relationship as follows:

| Slave device | TDR | RTS |
|---|---|---|
| Slave device 20 | 0 | 0 |
| Slave device 30 | 0 | 1 |

-continued

| Slave device | TDR | RTS |
|---|---|---|
| Slave device 40 | 1 | 0 |
| Slave device 50 | 1 | 1 |

Wherein, the "0" denotes a low voltage signal, the "1" denotes a high voltage signal, the "TDR" denotes the value from the control pin TDR, and the "RTS" denotes the value from the control pin RTS.

Moreover, the power circuit 70 can supply power to the MUX 60 via the transmitting pin TXD, the control pins TDR and RTS, and the ground GND of the RS232 serial interface 12 of the master device 10. Thereby, the MUX 60 doesn't require a separate power, which can save money.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A multi-channel communication circuit, comprising:
a master device having a serial interface;
a plurality of slave devices each having a serial interface; and
a multiplexer (MUX), a transmitting pin and a receiving pin of the serial interface of the master device respectively connected to a first data input pin and a first data output pin of the MUX, at least one control pin of the serial interface of the master device connected to at least one selecting pin of the MUX, a ground pin of the serial interface of the master device connected a ground pin of the MUX, at least one high voltage pin of the serial interface of the master device connected to a power pin of the MUX, transmitting pins of the serial interfaces of the plurality of slave devices respectively connected to a plurality of second data input pins of the MUX, and receiving pins of the serial interfaces of the plurality of slave devices respectively connected to a plurality of second data output pins of the MUX, the master device selectively communicating with one of the slave devices via transmitting a corresponding selecting signal to the at least one selecting pin of the MUX to make the first data input pin and the first data output pin of the MUX be respectively communicated with the second data output pin and the second data input pin of the MUX connected to the selected one of the slave devices.

2. The multi-channel communication circuit as claimed in claim 1, wherein a storage capacitor is connected between the ground pin and the power pin of the MUX to be charged by the at least one high voltage pin of the serial interface of the master device and discharge for the power pin of the MUX.

3. The multi-channel communication circuit as claimed in claim 1, wherein the amount of the slave devices is four, two control pins of the serial interface of the master device are respectively connected to two selecting pins of the MUX.

4. The multi-channel communication circuit as claimed in claim 1, wherein the serial interfaces of the master and slave devices are RS232 serial interfaces.

5. A multi-channel communication circuit, comprising:
a master device having a serial interface;
a plurality of slave devices each having a serial interface;
a multiplexer (MUX); and
a plurality of diodes, a transmitting pin and a receiving pin of the serial interface of the master device respectively connected to a first data input pin and a first data output pin of the MUX, at least one control pin of the serial interface of the master device connected to at least one selecting pin of the MUX, a ground pin of the serial interface of the master device connected a ground pin of the MUX, a plurality of voltage pins of the serial interface of the master device respectively connected to the anodes of the plurality of diodes, the cathodes of the plurality of diodes connected to a power pin of the MUX, transmitting pins of the serial interfaces of the plurality of slave devices respectively connected to a plurality of second data input pins of the MUX, and receiving pins of the serial interfaces of the plurality of slave devices respectively connected to a plurality of second data output pins of the MUX, the master device selectively communicating with one of the slave devices via transmitting a corresponding selecting signal to the at least one selecting pin of the MUX to make the first data input pin and the first data output pin of the MUX be respectively communicated with the second data output pin and the second data input pin of the MUX connected to the selected one of the slave devices.

6. The multi-channel communication circuit as claimed in claim 5, wherein a storage capacitor is connected between the ground pin and the power pin of the MUX to be charged by the plurality of voltage pins of the serial interface of the master device and discharge for the power pin of the MUX.

7. The multi-channel communication circuit as claimed in claim 5, wherein the amount of the slave devices is four, two control pins of the serial interface of the master device are respectively connected to two selecting pins of the MUX.

8. The multi-channel communication circuit as claimed in claim 5, wherein the amount of the diodes is three, the transmitting pin and two control pins of the serial interface of the master device are respectively connected the anodes of the three diodes.

9. The multi-channel communication circuit as claimed in claim 5, wherein the serial interfaces of the master and slave devices are RS232 serial interfaces.

* * * * *